Dec. 12, 1939.　　　G. BEYERLINE　　　2,182,956
CLUTCH PULLEY
Original Filed Aug. 14, 1935　　　4 Sheets-Sheet 2
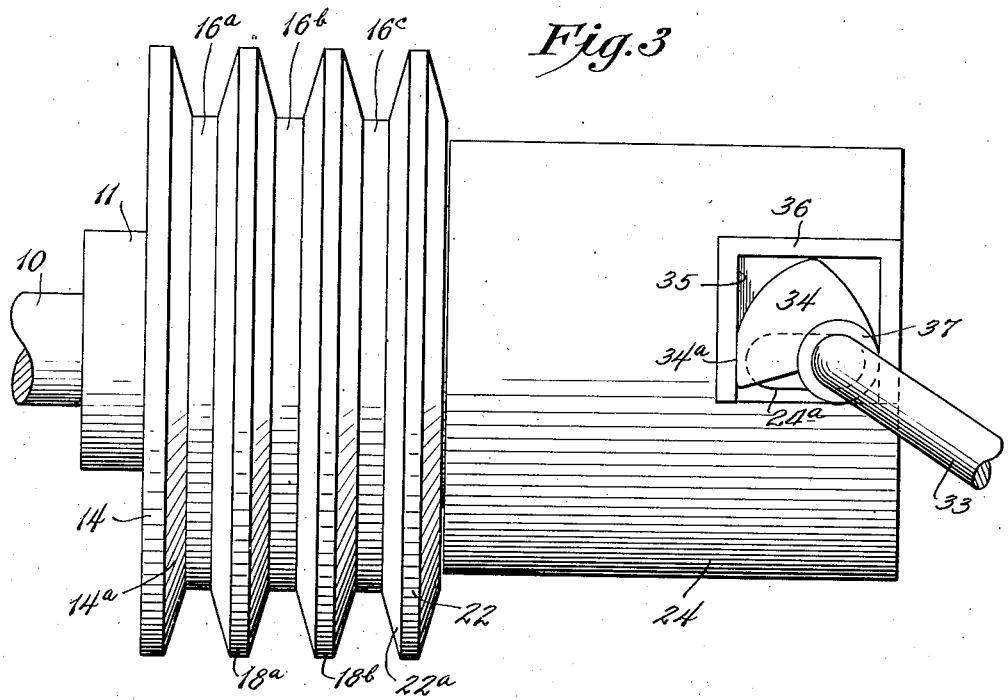
Fig. 3
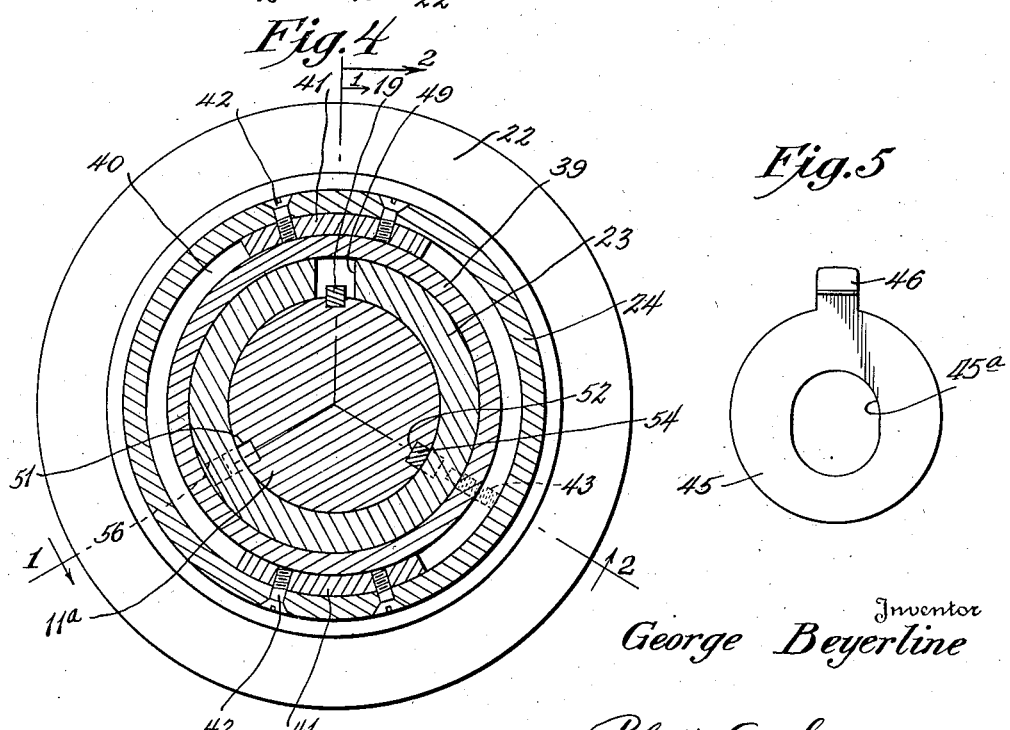
Fig. 4
Fig. 5
Inventor
George Beyerline
By Philip E. Siggers
Attorney Dec. 12, 1939.  G. BEYERLINE  2,182,956

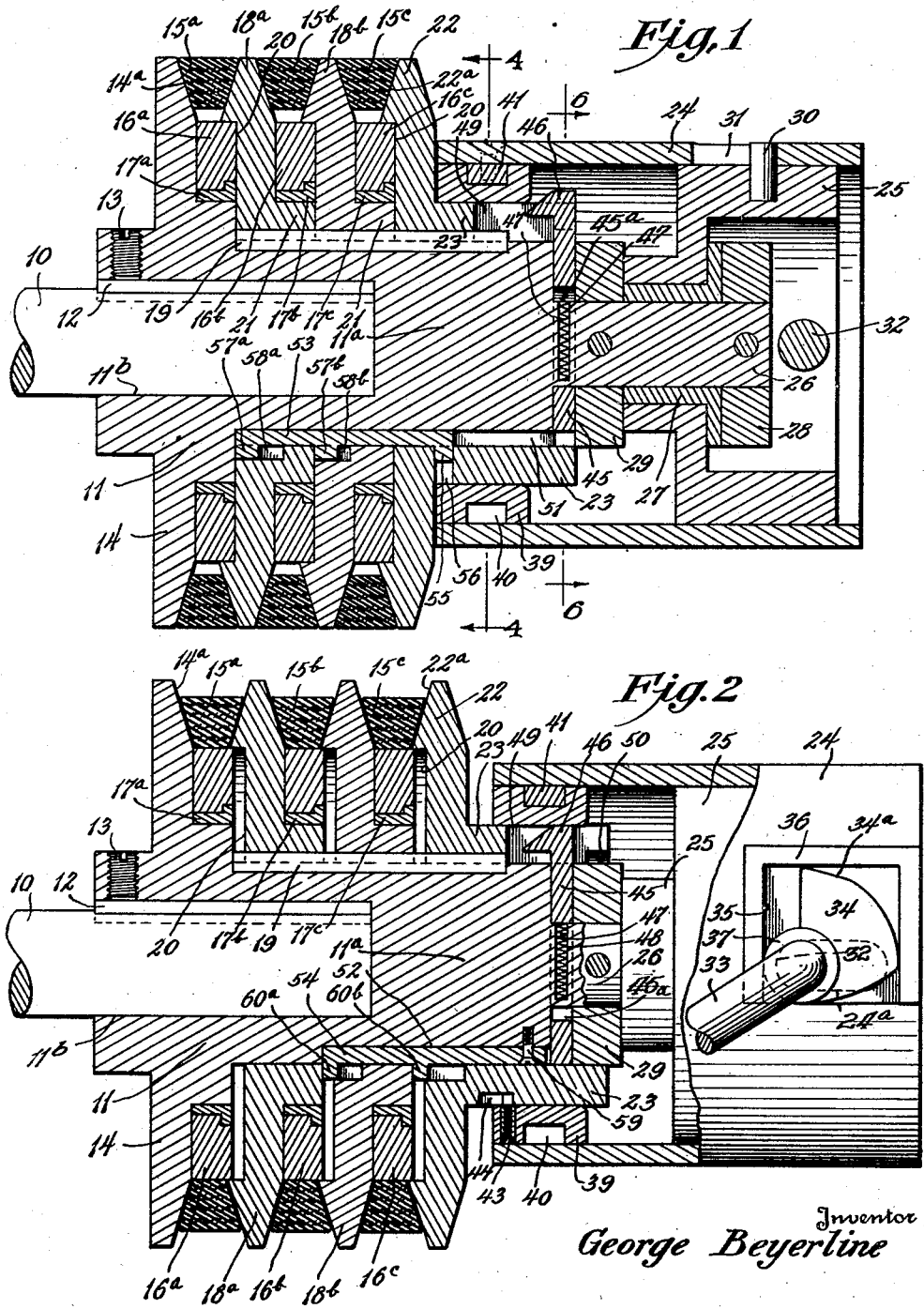

CLUTCH PULLEY

Original Filed Aug. 14, 1935  4 Sheets-Sheet 3

Inventor
George Beyerline
By Philip E. Sigger
Attorney

Dec. 12, 1939.                G. BEYERLINE                 2,182,956
                                CLUTCH PULLEY
              Original Filed Aug. 14, 1935       4 Sheets-Sheet 4

Inventor
George Beyerline

By Philip E. Liggers
                    Attorney

Patented Dec. 12, 1939

2,182,956

UNITED STATES PATENT OFFICE 2,182,956

CLUTCH PULLEY

George Beyerline, Los Angeles, Calif.

Application August 14, 1935, Serial No. 36,222
Renewed May 3, 1939

25 Claims. (Cl. 74—230.24)

This invention relates to clutch pulleys and among other objects aims to provide an improved V-belt pulley which may be manually changed from an effectively solid driving pulley to an idler pulley, thus permitting the starting, without a load, of the motor or machine to which the pulley is attached. The invention has more specific objects which will be understood from the following description of a preferred embodiment of the invention which is shown in the accompanying drawings forming a part of this specification.

In said drawings:

Fig. 1 is a longitudinal section of one form of the clutch pulley showing the parts locked so that the pulley may carry a full load, the section being substantially on line 1—1 of Fig. 4;

Fig. 2 is a longitudinal sectional view, the section being taken on line 2—2 of Fig. 4, but showing a portion of the cam operating mechanism in elevation and showing the parts unlocked so that the pulley operates as an idler;

Fig. 3 is an elevation of the pulley, shown locked as in Fig. 1;

Fig. 4 is a section on line 4—4 of Fig. 1;

Fig. 5 is a detail plan view of the lock ring;

Figure 6:
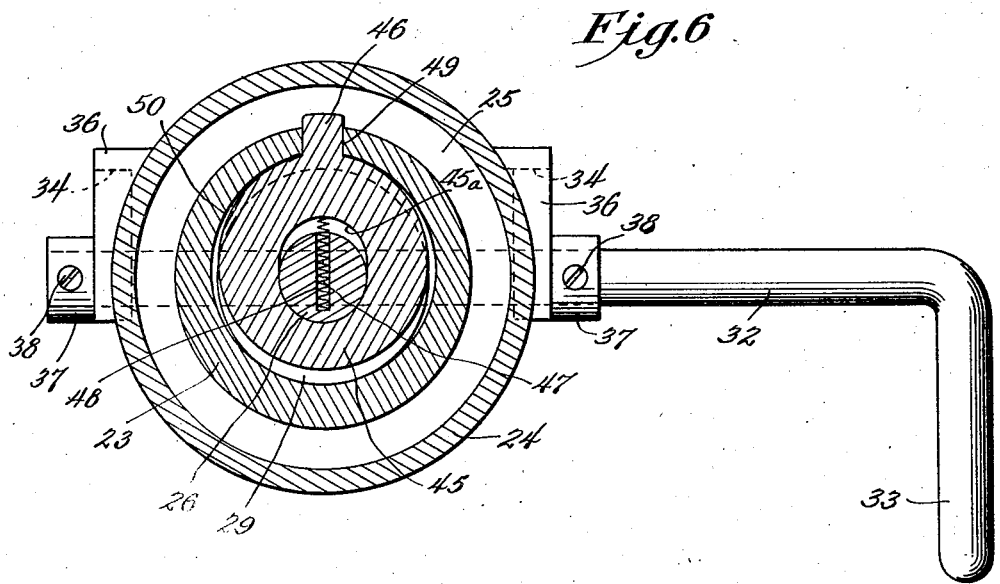
Fig. 6 is a section on line 6—6 of Fig. 1.

Referring particularly to the drawings, there is shown a motor shaft 10, which exemplifies any shaft adapted to drive or to be driven by a commercial multiple V-belt. For convenience of description, we shall assume that the shaft 10 is driven by a motor, for example an electric motor, an internal combustion engine, or a Diesel engine. Secured to the shaft 10 is the main driving member 11 to be described, said main driving member 11 being held by means of a key 12 and a set screw 13.

The main driving member 11 comprises in general a hub 11a counter-bored as shown at 11b to receive the end of the shaft 10, said hub supporting all of the working parts of the pulley including a disk 14. The disk 14 is preferably integral with the hub 11a and near its periphery is beveled on its inner face as indicated at 14a so as to make frictional contact with one side of one of the V-belts 15a which is driven by the pulley, as will be understood from Fig. 1. The other side of the V-belt engaged by the surface 14a is normally in contact with an opposite beveled face on another driving member (to be described) which is carried by the hub 11a but which may be moved longitudinally of said hub to permit the V-belt 15a to move downwardly (radially inwardly) until it rests upon an idler ring 16a, which is released and hence permitted to remain idle when the slidable driving member is moved relative to the main driving member. The idler ring 16a is rotatable relative to a bronze bearing ring 17a, which is preferably L-shaped in cross section to hold the idler ring on the hub 11a, and which is press-fitted upon the hub.

As previously stated, the hub of the main driving member carries one or more slidable driving members 18a, 18b which rotate with the hub because they are keyed thereto by means of the key 19, said key permitting sliding of said members 18a, 18b when the cam operating mechanism to be described is moved at the outer and stationary end of the pulley. A description of the slidable member 18a will also suffice as a description of the similar member 18b, it being understood that there may be many more of these slidable driving members keyed to the hub 11a. The slidable member 18a has a pair of beveled surfaces on opposite faces adjacent its periphery for frictional contact with two V-belts. A recess 20 is provided on one face, i. e., the face opposed to the disk 14, so as to receive the idler ring 16a. Said driving member 18a also has a hub 21 which is of such length that it may carry a bronze bearing ring 17b and an idler ring 16b similar to the parts 17a and 16a respectively. Said hub 21 has a key-way to receive the key 19 and hence the driving member 18a is slidable longitudinally of the main driving member 11 but always rotates therewith.

The slidable members 18a, 18b, etc. may be termed "intermediate driving members" because they are located between the two end disks 14, 22 which are at the extremities of the driving portion of the pulley. The end driving member 22 has a beveled surface 22a similar to the surface 14a but oppositely beveled for frictional engagement with the V-belt at that end of the pulley. It also has a hub 23 adapted to slide longitudinally of the main driving member and being provided with a key-way to receive the main driving key 19. On the opposite face, the end driving member 22 has a recess 20 to accommodate the adjacent idler ring 16c when the parts are locked together as in Fig. 1.

At the free end of the pulley there is a stationary collar which carries the operating mechanism and which is slidable relative to the hub of the main driving member but does not necessarily rotate at any time. The stationary collar comprises an outer sleeve 24 supported upon the interior collar 25 which surrounds a shaft extension 26 integral with the hub 11a and co-axial therewith. A bronze bushing 27 is interposed between the shaft extension 26 and the collar 25 and a pair of collars 28, 29 at either end of the bronze bushing 27, secured by tapered pins to the shaft extension 26, as shown, prevent movement of the bronze bushing on such shaft and prevent axial movement of the collar 25 while permitting the shaft 26 to rotate within the stationary sleeve 24. The collar 25 has a pin 30 projecting radially therefrom and sleeve 24 has a slot 31 for receiving the end of said pin, the sleeve 24 thereby being made longitudinally slidable relative to the collar 25, which can neither slide nor rotate.

Carried by and passing transversely through the collar 25 is a cam-operating rod 32 which is oscillated by means of the operating handle 33. At least one and preferably two cams 34 are rigidly secured upon the operating rod 32 and are adapted to engage cam recesses 35 formed in bosses 36 integral with and projecting outwardly from the sleeve 24 on opposite sides. The sleeve 24 has slots 24a on opposite sides through which operating rod 32 passes, thus permitting sliding of the sleeve when the rod is oscillated. The cams 34 may be secured upon the operating rod 32 by means of integral sleeves 37 and set screws 38.

It will be obvious that when the handle 33 is turned from the position of Fig. 3 to that of Fig. 2 the sleeve 24 will be moved to the right, thus permitting the movable driving members to slide along the hub of the main driving member. It will also be clear that the tension of the V-belts and their wedge shape will tend to separate the slidable driving members from each other and from the main driving member; but means are provided positively to separate said members, as will now be described.

Mounted within sleeve 24 adjacent the slidable driving member 22 is a grooved ring 39 whose inner surface has a sliding fit upon hub 23. Said grooved ring must be rotatable relative to the sleeve 24 and hence its groove 40 slidably receives a pair of arcuate bronze blocks 41 (Figs. 2 and 4) secured by screws 42 on the inside of sleeve 24. The grooved ring 39 carries a pin or stud 43 which projects inwardly into a straight groove 44 on the hub 23. The groove 44 is of such length that when the slidable sleeve 24 is moved to the right or from the position of Fig. 1 to that of Fig. 2, said pin 43 by engagement with the end of said slot will pull the end driving member 22 to the right to separate it from the adjacent intermediate driving member. The pin 43 also forces the grooved ring 39 to rotate with the end driving member 22. Said grooved ring has the further function of operating the locking ring to be described.

The locking ring 45, shown separately in Fig. 5, is an eccentrically bored flat disk or ring having an integral lug 46 provided with a pointed nose, said nose providing a cam surface for engagement by the grooved ring 39 when the same is moved to the right (from the position of Fig. 1 to that of Fig. 2) by the slidable sleeve 24 under the influence of the cams 34. To cause the locking ring to assume its locking position as in Fig. 1, an expansion spring 47 is received within a small bore 48 extending part way through the shaft extension 26. Said shaft extension is of smaller diameter than the central aperture 45a of the locking ring, which may therefore have lateral movement relative to the shaft extension. The hub 23 of the end driving member has a slot 49 (Figs. 1 and 6) which receives the lug 46, so that the locking ring does not interfere with the sliding of the end member 22. The end of the hub 23 also has an eccentric counter-bore 50 (Figs. 2 and 6) which is slightly larger than the locking ring and into which the locking ring fits when the pulley is adapted to deliver power to the V-belt (see Fig. 1). The hub of the main driving member has key-ways 51 and 52 to receive a pulling key 53 and a stop key 54 respectively. Preferably, the keys 19, 53 and 54 are arranged 120° apart as shown in Fig. 4. The pulling key 53 has a lug 55 which is received within a recess 56 provided on the interior of the hub 23 and it is freely slidable in its key-way 51 so that its other projections 57a and 57b may engage the slidable driving members 18a and 18b respectively, recesses 58a and 58b being cut in the hubs 21 for this purpose. It will be clear that when the end driving member 22 is moved outwardly by turning the operating rod 32, as previously described, the pulling key 53 will also move the intermediate driving members 18a and 18b in the same direction. The recesses or grooves 44, 58a, 58b are so designed that the end driving member 22 is first released and then the intermediate driving members are moved in the same direction, all of said members being moved sufficiently far to permit the V-belts to engage the idler rings 16a, 16b, 16c without frictional contact with the beveled faces of the driving members, as will be understood from Fig. 2. The stop key 54 limits the movement of the intermediate members 18a and 18b as will be understood from Fig. 2 and said key is secured to the hub 11a by means of a screw 59, as shown in Fig. 2. The stop key has stops 60a, 60b which the ends of the hubs 21 abut when the intermediate driving members are released. It will be obvious that the slidable driving members are sharply limited in their movements and can neither approach each other too closely (which would pinch the V-belts) nor can they be separated too far (which would expose gaps between the idler rings and the adjacent driving members).

The locking ring 45, so long as it is in the position of Fig. 1, when it is received within the counter-bore 50, absolutely prohibits any sliding movement of the hub 23, because the end of hub 23 then abuts the flat inner face of the locking ring, or rather that part of it which is within counterbore 50. See Fig. 6. The locking ring cannot move otherwise than radially of the shaft, or at right angles to the direction of movement of hub 23. As the end driving member 22 is thrust firmly against the intermediate driving members and the adjacent idler ring, it follows that the intermediate driving members are also prevented from separating from each other and from the main driving member. Hence the V-belts must frictionally engage the driving members along the outer portions of their peripheries and must be held out of contact with the idler rings. As soon, however, as the locking ring is moved out of the eccentric counter-bore by engagement of the grooved ring 39 with the lug 46, the locking ring no longer provides a latch preventing sliding movement of hub 23 and said hub is free to slide along the main driving key 19 and does so slide when pulled by the pin 43 projecting from the ring 39. When the pulley is to be "clutched" to the V-belts, lever 33 is swung counterclockwise as viewed in Fig. 2, moving sleeve 24 to the left, whereupon pin 43 moves to the left end of groove 44 and then thrusts member 22, with hub 23, to the left. The left side of member 22 then engages the right face of member 18b, which is also moved to the left until it engages member 18a, which closes the gap between it and member 14. All the parts are then as shown in Fig. 1, since locking ring 45 automatically engages the eccentric counterbore 50. The cam or cams 34 serve to lock the sleeve 24, and parts secured thereto and governed thereby, in either of the extreme positions which the sleeve may assume, and this locking is quite independent of the lock for the slidable driving members, although the latter lock is releasable only when the cam 34 moves the sleeve. The cam is so designed as to be nearly frictionless, and its flat portion 34a not only affords the necessary clearance but serves to hold the sleeve 24 and the collar which supports it in such position that these parts may remain stationary while the pulley is rapidly revolving and delivering power to the V-belts. At this time there is a slight clearance, as shown in Figs. 1 and 3, between the end of the sleeve 24 and the adjacent face of the end driving member 22.

Figure 7:
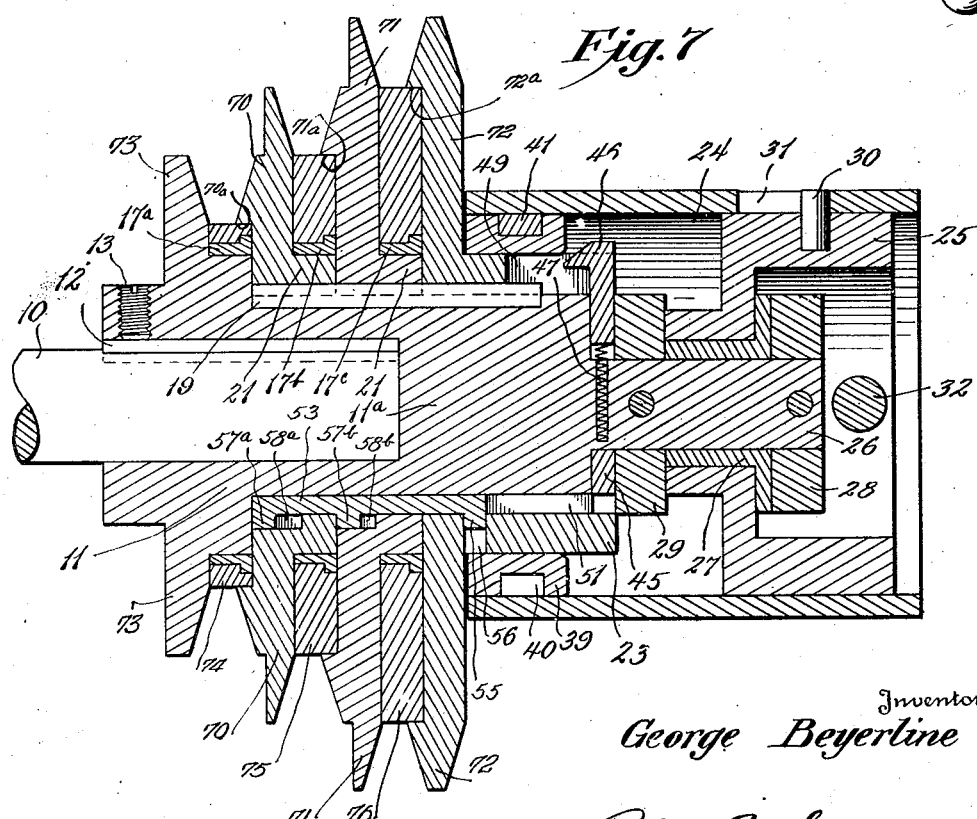
Fig. 7 is a view similar to Fig. 1 but showing a step pulley.

In Fig. 7, a step pulley for V-belts is shown, which in construction is similar to the pulley of Figs. 1 and 2. The section of Fig. 7 is the same as that of Fig. 1 and as corresponding parts bear the same reference numerals, it will be unnecessary to describe the corresponding parts or their functions. The parts which distinguish Fig. 7 from Fig. 1 are the driving members or disks 70, 71, and the end driving member 72, all of which are of larger diameter than the main driving member 73. Idlers 74, 75 and 76, of progressively increasing diameter, are freely rotatable on bearing rings 17a, 17b, 17c respectively under shoulders 70a, 71a and 72a respectively formed in the side faces of the driving members, as clearly shown. The V-belts (not shown) travel in the spaces provided for them between opposed faces of the driving members, as will be understood from Fig. 1. Control of the clutch pulley, and locking thereof, are effected as will be perfectly clear from the foregoing description.

An especially important feature of this invention is the fact that the change is made from an idler to a driving pulley and vice versa substantially without any friction. There is no power loss whatever in clutching and unclutching the pulley. When the pulley is unlocked to serve as an idler, there are no frictional losses except the very negligible friction between the idler rings and the bearings which support them.

Figure 8:
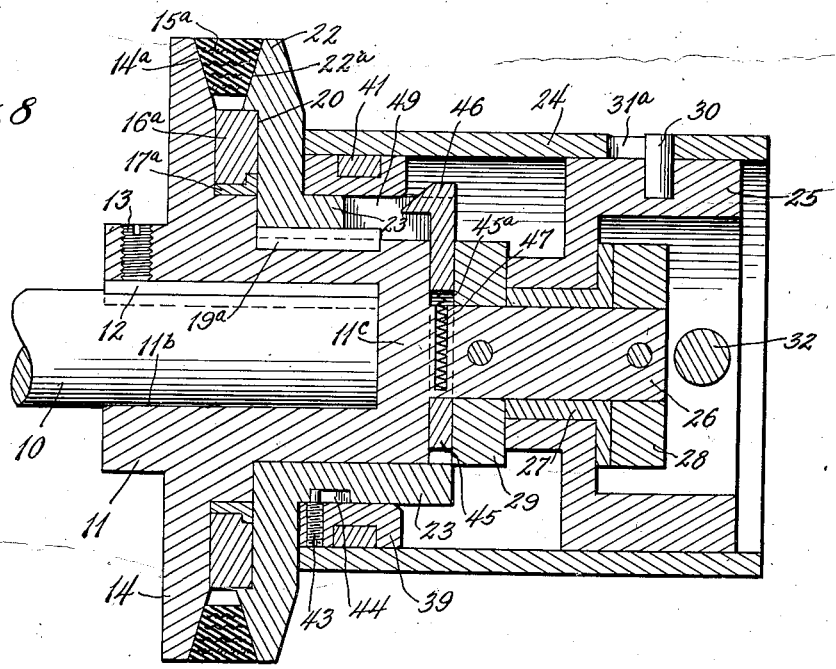
Fig. 8 is a view of a single belt clutch pulley made in accordance with the invention, the view being a diametric cross section of the pulley when locked.
Figure 9:
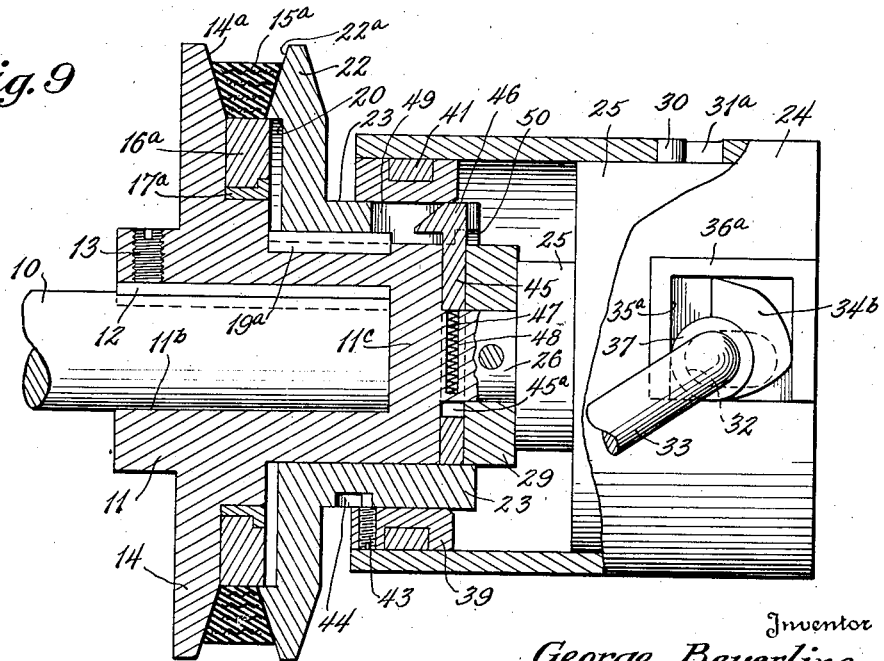
Fig. 9 is a cross section of the clutch pulley of Fig. 8, but showing the parts in unlocked position.

While the pulley shown in the drawings is a multiple V-belt pulley, if desired the pulley may be constructed to drive or to be driven by a single V-belt. Such a construction is clearly shown in Figs. 8 and 9, which are like Figs. 1 and 2, respectively, except that only two belt-engaging members 14, 22, for engagement with a single V-belt 15a, are shown. As nearly all the parts of Figs. 8 and 9 are the same as corresponding parts of Figs. 1 and 2, the same reference numerals are used, the sole differences being a shortening of the hub, which is designated as 11c, and omission of the pulling and stop keys 53, 54, respectively, together with their grooves 51, 52. Of course, only one idler 16a and one bearing ring 17a are used.

Obviously the present invention is not limited to the specific embodiments shown in the accompanying drawings for the purpose of illustration. Moreover, it is not indispensable that all the features of the invention be used conjointly, since they may be employed advantageously in various combinations and subcombinations.

Having described three embodiments of my invention, what I claim as new and desire to secure by Letters Patent of the United States of America is:

1. A multiple V-belt clutch pulley characterized by the employment of separable parts frictionally engaging the V-belts; a stationary collar; a non-rotatable sleeve slidable on the collar; means connected with the sleeve and engaging said separable parts to separate the parts when the sleeve is slid in one direction; a cam for sliding the sleeve and for holding the same in either extreme position; means for operating the cam manually; and a lock adapted to be released when the sleeve is moved in the direction which effects separation of the parts engaging the V-belts; said sleeve carrying means for direct engagement with said lock to release it.

2. A unitary, multiple V-belt clutch pulley comprising a plurality of separable disk members adapted to frictionally engage the V-belts; hub means attached to one of the disk members; idler rings interposed between said disk members; cam means; a sleeve operated by said cam means; and means connecting the sleeve with the separable disk members to move them apart; said sleeve, cam means and connecting means all forming a part of the clutch pulley and being supported on said hub means.

3. A multiple belt clutch pulley characterized by the employment of a main driving member adapted to be rigidly secured upon a shaft and a plurality of driving members rotatable with the main driving members and separable therefrom to release the belts; a sleeve; means to slide the sleeve; means connecting the sleeve with the separable driving members; means on the main driving member to limit said separation; and idlers interposed between the driving members and adapted to be engaged by the belts when the driving members are separated.

4. A multiple belt clutch pulley characterized by the employment of a main driving member adapted to be rigidly secured upon a shaft and a plurality of driving members slidable upon the main driving member but rotatable therewith; a stationary collar carried by the main driving member; a sleeve slidable on the collar; a manually operated cam on a camshaft carried by the collar and adapted to reciprocate the sleeve; means connecting the sleeve with the slidable driving members to separate them at will from each other and from the main driving member; and idler rings interposed between the driving members.

5. A multiple belt clutch pulley characterized by the employment of a main driving member and a plurality of slidable driving members keyed to the main driving member; means secured to the main driving member to limit sliding movement of the slidable driving members; and manually operable means carried by the main driving member and connected with the slidable driving members to move them apart and also away from the main driving member.

6. A multiple belt clutch pulley characterized by the employment of a main driving member and a plurality of slidable driving members keyed to the main driving member; means secured to the main driving member to limit sliding movement of the slidable driving members; manually operable means carried by the main driving member and connected with the slidable driving members to move them apart and also away from the main driving member; and a locking ring carried by the main driving member and securing the driving members against separation, said locking ring being released by said manually operable means before separation of said driving members is initiated.

7. A multiple belt clutch pulley comprising, in combination, a main driving member; a plurality of slidable driving members rotatable with the main driving member; a hub integral with the slidable driving member which is farthest from the belt driving portion of the main driving member; said hub having an eccentric counterbore; a locking ring adapted to fit in said eccentric counterbore when the driving members are all close together; a spring supported on said main driving member and urging said locking ring against said counterbore; and means associated with a slidable sleeve and adapted to release said locking ring from said counterbore when said slidable sleeve is moved in one direction.

8. In a clutch pulley having a main driving member adapted to be directly secured to a shaft, that improvement which consists in the provision of a locking ring supported by and movable transversely of the main driving member and being rotatable therewith; and two relatively separable pulley elements which are held together by the locking ring but which may be moved longitudinally of the shaft when said locking ring has been moved to releasing position.

9. The invention claimed in claim 8 wherein the locking ring is depressed to move into releasing position and is normally held in locking position by means of a spring supported on the main driving member; the means to depress the locking ring comprising means which is movable manually longitudinally of the shaft.

10. In a clutch pulley for multiple or single V-belts, said clutch pulley having separable parts for engaging the sides of the V-belts, said separable parts being separable sufficiently far to be entirely out of engagement with the V-belts, and manually controlled means to separate said parts, locking means to hold the parts normally in belt-engaging position; said locking means automatically engaging one of the separable parts when said separable parts are close enough together to engage a V-belt, and being moved to releasing position by manipulation by said manually operable means prior to the separation of said separable means.

11. A clutch pulley comprising, in combination, a pair of separable parts for engaging the sides of a belt adapted to drive or be driven by the clutch pulley, said separable parts being separable sufficiently far to be entirely out of engagement with any of the surfaces of the belt; supporting means on one of said parts; locking means on said supporting means automatically engaging the other part to lock the parts against separation; and manually operable means on the pulley to disengage said locking means.

12. A clutch pulley comprising, in combination, a pair of separable parts for engaging the sides of a belt adapted to drive or be driven by the clutch pulley, said separable parts being separable sufficiently far to be entirely out of engagement with any of the surfaces of the belt; supporting means on one of said parts; automatic locking means on said supporting means for locking the parts against separation; and manually operable means movable in one direction and first disengaging said locking means and then separating said belt-engaging parts; said manually operable means, when moved in the opposite direction, pushing said separable parts together; said locking means then automatically locking.

13. A clutch pulley for V-belts comprising in combination, separable belt-engaging parts; automatic locking means to hold said parts in belt-engaging position; an idler ring between each pair of belt-engaging parts and adapted to be engaged by the inside of the V-belt when said parts are separated; and manually operable means to separate and bring together said separable parts; said manually operable means carrying a lock-engaging member and acting to release said lock prior to the separation of said parts.

14. A clutch pulley having separable belt-engaging members, and means forming a unitary part of the pulley and mechanically connected with the movable belt-engaging members for separating said members longitudinally of the pulley and for bringing them together again; said means including mechanical connections to effect a progressive separation of the members.

15. A clutch pulley according to claim 14, wherein there are a series of idlers forming a unitary part of the pulley, there being one idler between each pair of belt-engaging members and all the idlers rotating freely about the axis of rotation of the belt-engaging members.

16. A clutch pulley according to claim 14, having a stop member which is immovable longitudinally of the pulley and is engageable by each of the movable belt-engaging members so that each of said members, after said progressive separation, is properly spaced relative to the others.

17. A clutch pulley comprising, in combination, a main driving member adapted to be rigidly secured to a shaft and a plurality of driving members slidable upon the main driving member but rotatable therewith; a manually controlled means slidably mounted on the main driving member and adapted, when slid in one direction, to effect the separation of the various driving members, and when moved in the other direction, to bring them close together; and means connected with the manually controlled means and engaging the several driving members progressively, as the manually controlled means is moved to effect separation of the driving members, to move first the nearest driving member, then the next nearest driving member, and so on.

18. The invention according to claim 17, wherein said means engaging the several driving members progressively is a key movable in a slot extending longitudinally of the main driving member and having projections extending into recesses on the inside walls of the slidable driving members.

19. The invention according to claim 17, wherein all but one of the slidable driving members is stopped, after said separation, by projections on a stop key secured in a longitudinal groove in the main driving member.

20. The invention according to claim 17, wherein the slidable driving members are held in close-together positions by locking means carried by the main driving member; said manually controlled member disengaging said locking means automatically when slid in the direction which effects separation of the slidable driving members; said locking means automatically engaging when permitted to by the position of the manually controlled member.

21. The invention according to claim 11 wherein there is an idler ring located between the pair of separable belt-engaging parts, and said idler ring is adapted to rotate independently of either of said belt-engaging parts when separated, said idler ring being of sufficient diameter to be engaged by the belt when the belt-engaging parts are separated.

22. In a clutch pulley for multiple or single V-belts, said clutch pulley having separable parts for engaging the sides of the V-belts; locking means to hold the separable parts normally in belt-engaging position; said locking means directly engaging one of the separable parts to lock the same, but the parts being so proportioned and arranged that such engagement will take place only when said separable part is moved to belt-engaging position; and operator-controlled means to disengage said locking means.

23. In a clutch pulley for multiple or single V-belts, said clutch pulley having separable parts for engaging the sides of the V-belts; locking means to hold the separable parts normally in belt-engaging position; means to disengage said locking means; and means actuated by movement of the disengaging means to pull the separable parts apart.

24. The invention according to claim 22, wherein the locking means is built into and wholly concealed within the body of the clutch pulley and is made automatic in action by a spring, said spring yielding to said operator-controlled means.

25. The invention according to claim 22, wherein the locking means comprises a spring-actuated member movable radially outwardly relative to the axis of rotation of the clutch pulley, and the operator-controlled means acts to depress the locking member against the resistance of the spring.

GEORGE BEYERLINE.